US009864467B2

(12) United States Patent
Tai et al.

(10) Patent No.: US 9,864,467 B2
(45) Date of Patent: Jan. 9, 2018

(54) CALIBRATION METHOD AND CAPACITIVE SENSING DEVICE

(71) Applicant: Sitronix Technology Corp., Hsinchu County (TW)

(72) Inventors: Hung-Yen Tai, Hsinchu County (TW); Chun-Kuan Wu, Hsinchu County (TW); Ching-Jen Tung, Hsinchu County (TW); Chen-Yuan Yang, Hsinchu County (TW)

(73) Assignee: Sitronix Technology Corp., Hsinchu County (TW)

( * ) Notice: Subject to any disclaimer, the term of this patent is extended or adjusted under 35 U.S.C. 154(b) by 106 days.

(21) Appl. No.: 15/054,143

(22) Filed: Feb. 26, 2016

(65) Prior Publication Data

US 2017/0024071 A1 Jan. 26, 2017

Related U.S. Application Data

(60) Provisional application No. 62/194,834, filed on Jul. 21, 2015.

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01)

(58) Field of Classification Search
CPC .................................. G06F 3/0418; G06F 3/044
See application file for complete search history.

(56) References Cited

U.S. PATENT DOCUMENTS

| | | | |
|---|---|---|---|
| 2012/0256869 A1* | 10/2012 | Walsh | G06F 3/0416 345/174 |
| 2013/0229382 A1* | 9/2013 | Huang | G06F 3/044 345/174 |
| 2013/0257797 A1* | 10/2013 | Wu | G06F 3/044 345/174 |
| 2013/0285971 A1 | 10/2013 | Elias | |
| 2013/0328823 A1* | 12/2013 | Liu | G06F 3/044 345/174 |
| 2014/0333581 A1* | 11/2014 | Cormier, Jr. | G06F 3/044 345/174 |

(Continued)

FOREIGN PATENT DOCUMENTS

| | | |
|---|---|---|
| CN | 103218096 A | 7/2013 |
| TW | 201344594 A | 11/2013 |

(Continued)

*Primary Examiner* — Hong Zhou
(74) *Attorney, Agent, or Firm* — Winston Hsu

(57) ABSTRACT

A calibration method for a capacitive sensing device is disclosed. The capacitive sensing device is capable of operating in a self-sensing mode or a mutual-sensing mode. The calibration method includes detecting a capacitance change of a panel in the self-sensing mode to generate a self-sensing output signal, detecting a capacitance change of the panel in the mutual-sensing mode to generate a mutual-sensing output signal, calculating a self-sensing difference between the self-sensing output signal and a self-sensing static parameter, and calibrating the mutual-sensing output signal according to the mutual-sensing output signal and the self-sensing difference.

8 Claims, 11 Drawing Sheets

(56) References Cited

U.S. PATENT DOCUMENTS

| | | | | |
|---|---|---|---|---|
| 2015/0077386 A1* | 3/2015 | Huang | ................ | G06F 3/0418 345/174 |
| 2015/0162932 A1* | 6/2015 | Page | ................ | G01R 27/2605 324/658 |
| 2016/0077667 A1* | 3/2016 | Chiang | ................ | G06F 3/0418 345/173 |

FOREIGN PATENT DOCUMENTS

| | | | |
|---|---|---|---|
| TW | 201447706 | A | 12/2014 |
| TW | 201512674 | A | 4/2015 |
| TW | 201616326 | A | 5/2016 |

\* cited by examiner

CALIBRATION METHOD AND CAPACITIVE SENSING DEVICE

CROSS REFERENCE TO RELATED APPLICATIONS

This application claims the benefit of U.S. Provisional Application No. 62/194,834 filed on Jul. 21, 2015, the contents of which are incorporated herein.

BACKGROUND OF THE INVENTION

1. Field of the Invention

The present invention is related to a calibration method and capacitive sensing device, and more particularly, to a calibration method and capacitive sensing device which suppress noises in a mutual-sensing mode with help from a self-sensing mode.

2. Description of the Prior Art

With advances in touch control technology, conventional keyboards and mice are gradually replaced with touch panels in electronic devices. The touch panel is plied upon a display panel, and a user can tab the display panel via a finger or a touch pen to operate the electronic device. As a result, since the conventional keyboard area is no longer required in the front surface of the electronic device, the display area can be enlarged on the electronic device.

A user instruction sent to the touch panel can be sensed based on resistance, capacitance, light or sound change around the touch panel. Particularly, the capacitive touch panel has great sensitivity to the user instruction, and is widely employed various kinds of electronic devices. The capacitive touch panel determines a touched region according to a capacitive change of the touch panel. However, other than the capacitors designed by the manufacturer, there is a parasitic capacitor in the touch panel. The parasitic capacitor results in a bias in a touch sensing signal, which misguides the consequent touch recognition process. Therefore, the bias of the touch sensing signal has to be canceled.

SUMMARY OF THE INVENTION

It is therefore an objective of the present invention to provide a calibration method and capacitive sensing device for canceling a signal bias caused by a panel parasitic capacitor.

The present invention discloses a calibration method for a capacitive sensing device, the capacitive sensing device capable of operating in a self-sensing mode or a mutual-sensing mode, the calibration method comprising detecting a capacitance change of a panel in the self-sensing mode to generate a self-sensing output signal, detecting a capacitance change of the panel in the mutual-sensing mode to generate a mutual-sensing output signal, calculating a self-sensing difference between the self-sensing output signal and a self-sensing static parameter, and calibrating the mutual-sensing output signal according to the mutual-sensing output signal and the self-sensing difference.

The present invention further discloses a capacitance sensing device for a panel, the capacitive sensing device comprising a self-sensing unit, electrically coupled to the panel, for detecting a capacitance change of the panel to generate a self-sensing output signal, a mutual-sensing unit, electrically coupled to the panel, for detecting a capacitance change of the panel to generate a mutual-sensing output signal, a computation unit, electrically coupled to the self-sensing unit, for calculating a self-sensing difference between the self-sensing output signal and a self-sensing static parameter, and a calibration unit, electrically coupled to the computation unit and the mutual-sensing unit, for calibrating the mutual-sensing output signal according to the mutual-sensing output signal and the self-sensing difference.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
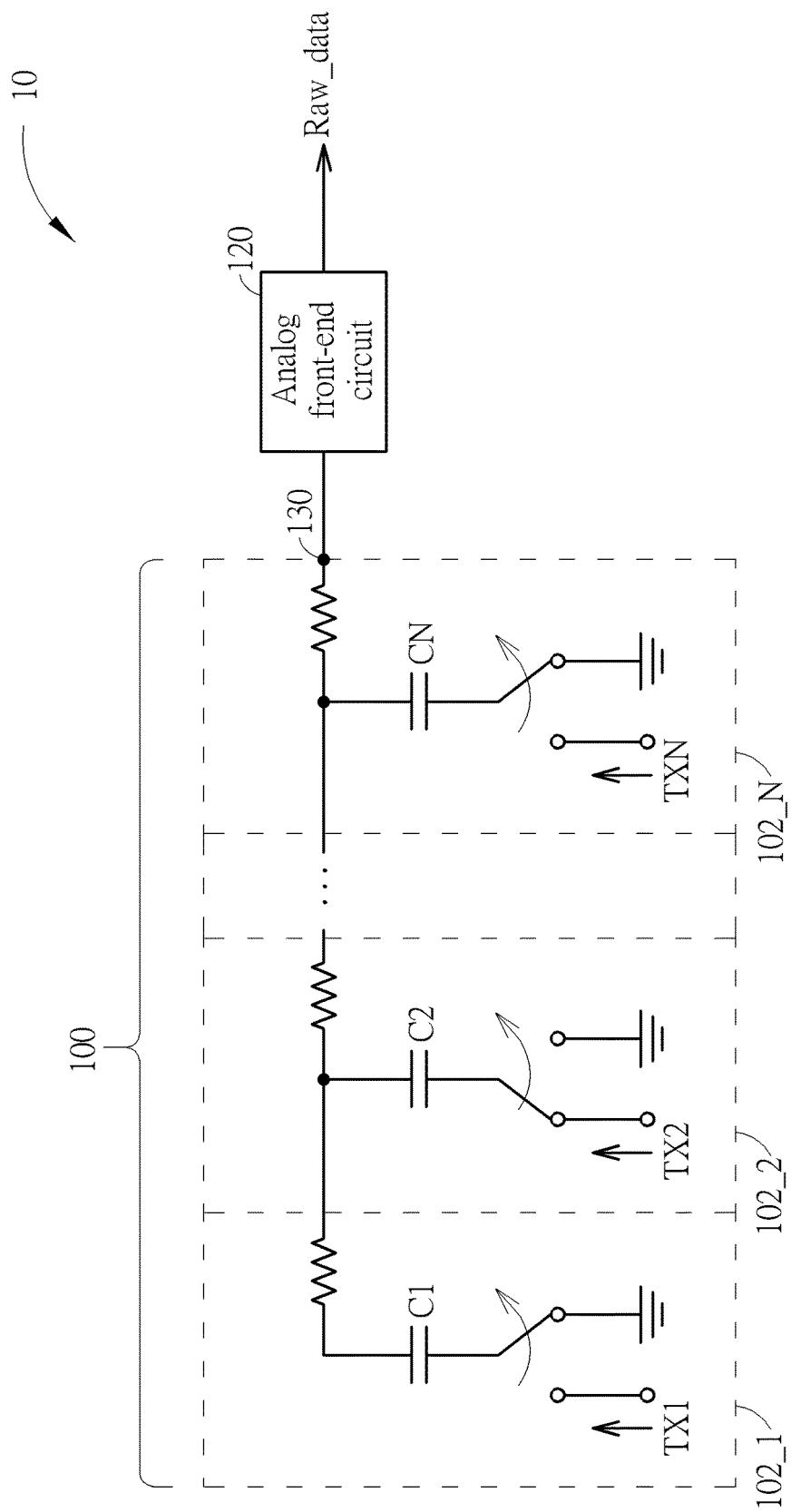
FIG. 1A is a schematic diagram of a capacitive touch control device.
Figure 2:
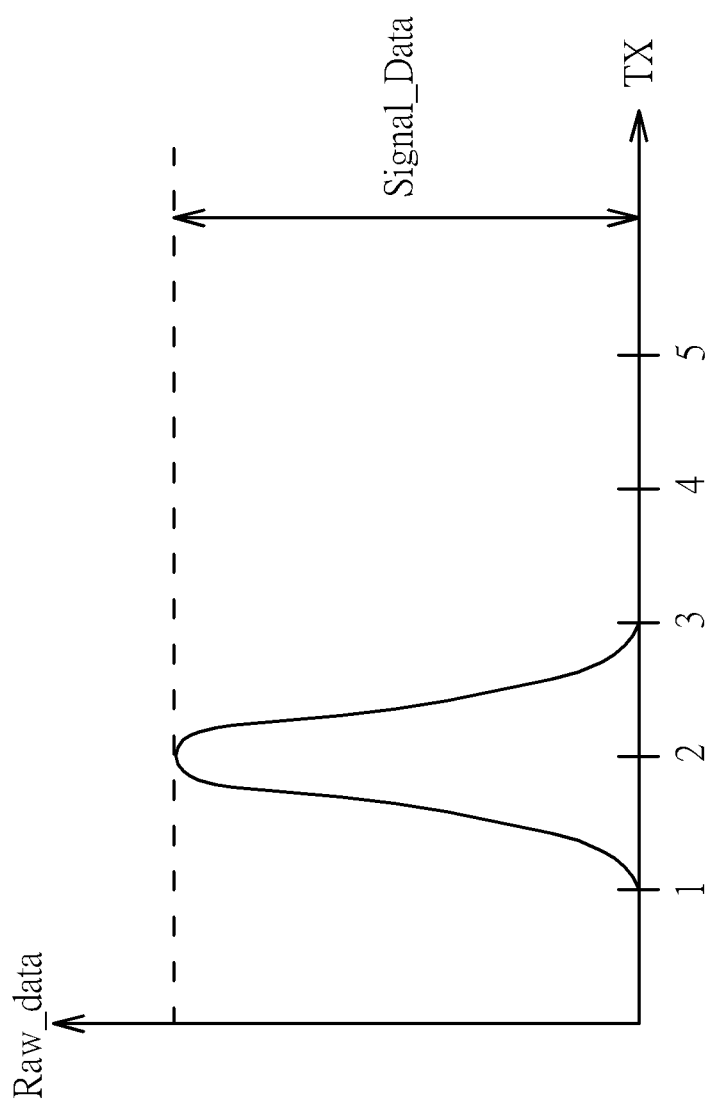
FIG. 2 is a schematic diagram of an ideal output signal of the capacitive touch control device of FIG. 1A.

Please refer to FIG. 1A, which is a schematic diagram of a capacitive touch control device 10. The capacitive touch control device 10 includes a panel 100 and an analog front-end circuit 120. The panel 100 includes regions 102_1-102_N, each of which functions as a combination of an equivalent capacitor and an equivalent resistor, as illustrated in FIG. 1A. First terminals of the equivalent capacitors C1-CN is utilized for grounding or receiving driving signals TX1-TXN. The driving signals TX1-TXN are one by one fed into the panel 100. That is, when the driving signal TX1 is fed, the regions 102_2-102_N are grounded. Similarly, when the driving signal TX2 is fed, the regions 102_1, 102_3-102_N are grounded. The analog front-end circuit 120 is utilized for detecting voltage change of a node 130 when the driving signals TX1-TXN are fed and generating an output signal Raw_data to indicate a touched position of the panel 100. For example, when a finger touches the region 102_2, a voltage of the node 130 when the driving signal TX2 is fed into the panel 100 will be different from the voltage of the node 130 when the other driving signals TX1, TX3-TXN are fed into the panel 100. Such a difference will be reflected in the output signal Raw_data, as illustrated in FIG. 2. As such, the event that the finger touches the region 102_2 can be successfully detected.

Figure 1B:
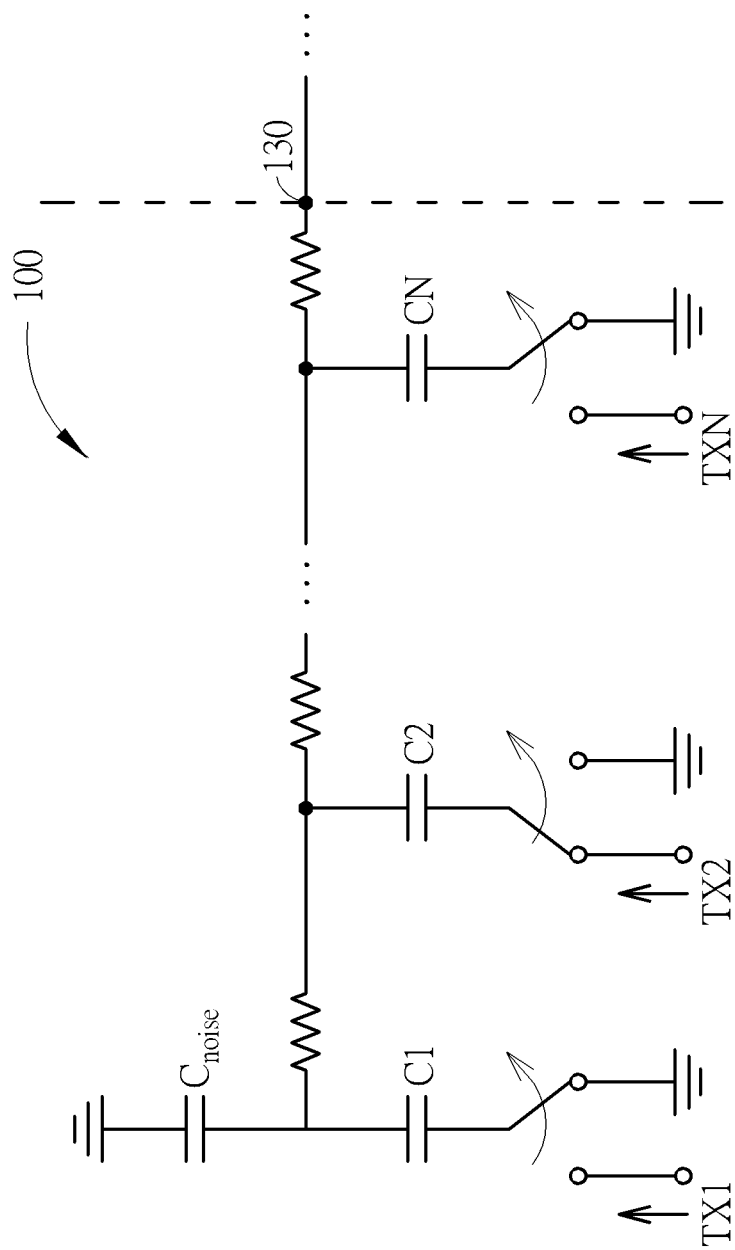
FIG. 1B is a schematic diagram of an equivalent circuit of a panel.
Figure 3:
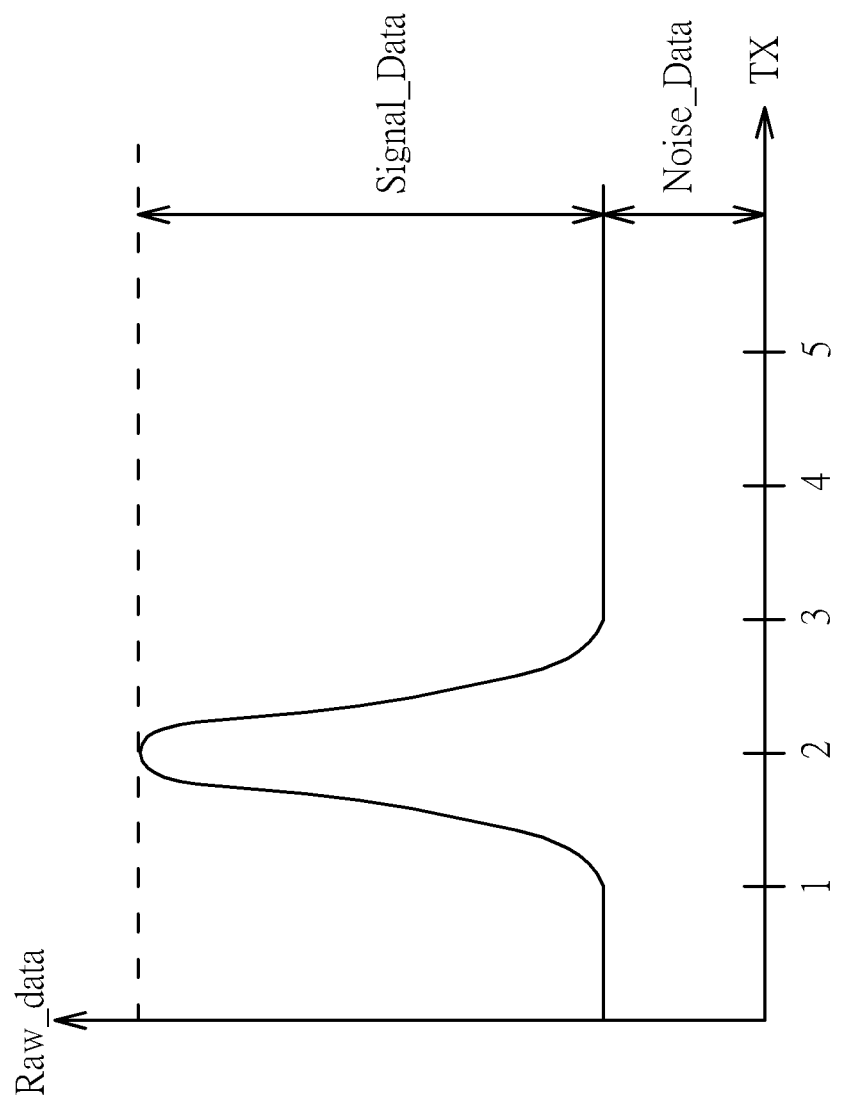
FIG. 3 is a schematic diagram of an actual output signal of the capacitive touch control device of FIG. 1A.

However, defects of the panel 100 result in a parasitic capacitor $C_{noise}$, as shown in FIG. 1B. The parasitic capacitor $C_{noise}$ causes a voltage bias on the node 130, and the voltage bias is also reflected in the output signal Raw_data, i.e. Raw_data=Signal_Data+Noise_Data (Signal_Data denotes a signal component, and Noise_Data denotes a bias component), as shown in FIG. 3. Since using "Raw_data=0" to represent that there is no object touching the panel is advantageous for the following signal recognition processing, an embodiment for removing the bias component Noise_Data from the output signal Raw_data is provided below.

Figure 4:
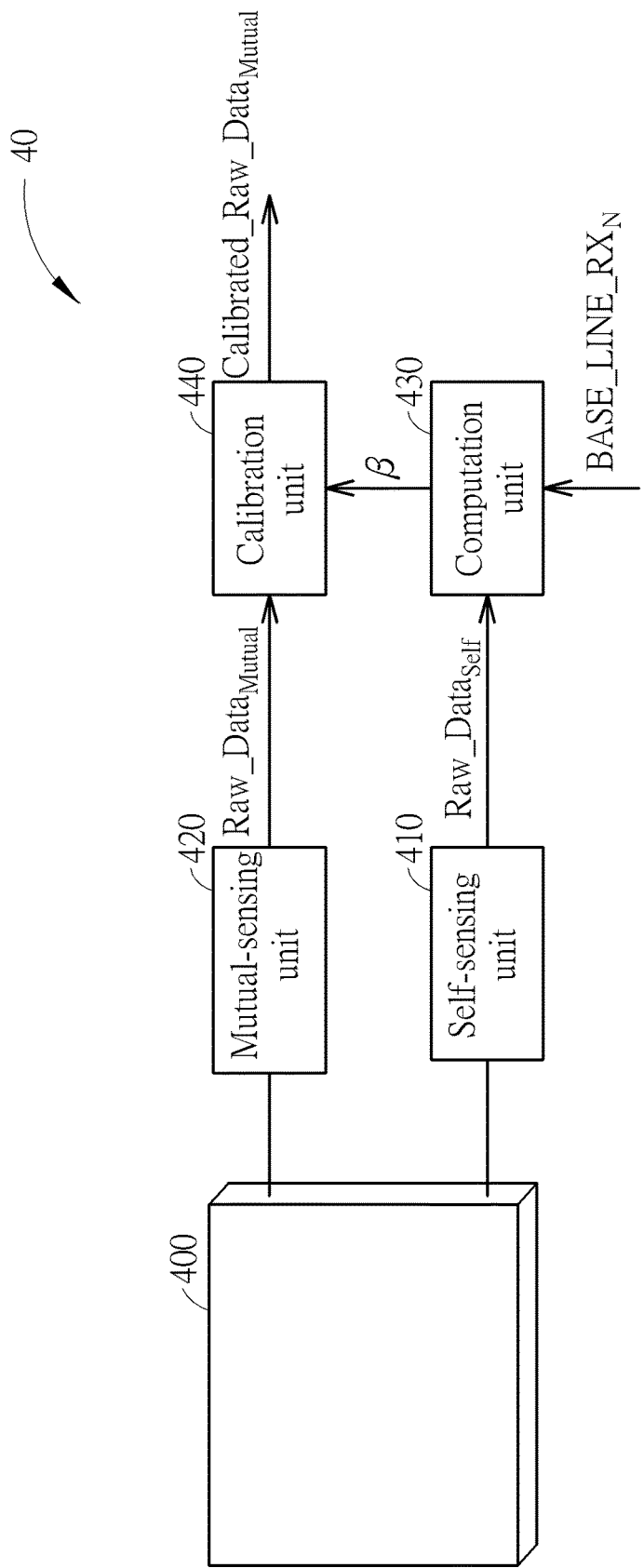
FIG. 4 is a schematic diagram of a capacitive sensing device according to an embodiment of the present invention.

Please refer to FIG. 4, which is a schematic diagram of a capacitive sensing device 40 according to an embodiment of the present invention. The capacitive sensing device 40 is utilized for detecting a capacitance change of a panel 400. The capacitive sensing device 40 includes a self-sensing unit 410, a mutual-sensing unit 420, a computation unit 430 and a calibration unit 440. The self-sensing unit 410 is utilized for detecting the capacitance change of the panel 400 to generate a self-sensing output signal $Raw\_Data_{Self}$. The mutual-sensing unit 420 is utilized for detecting the capacitance change of the panel 400 to generate a mutual-sensing output signal $Raw\_Data_{Mutual}$. The computation unit 430 is utilized for calculating a self-sensing difference $\beta$ between the self-sensing output signal $Raw\_Data_{Self}$ and a self-sensing static parameter $BASE\_LINE\_RX_N$. The calibration unit 440 is utilized for calibrating the mutual-sensing output signal $Raw\_Data_{Mutual}$ according to the mutual-sensing output signal $Raw\_Data_{Mutual}$ and the self-sensing difference $\beta$ and generating a calibrated mutual-sensing output signal $Calibrated\_Raw\_Data_{Mutual}$.

Figure 5:
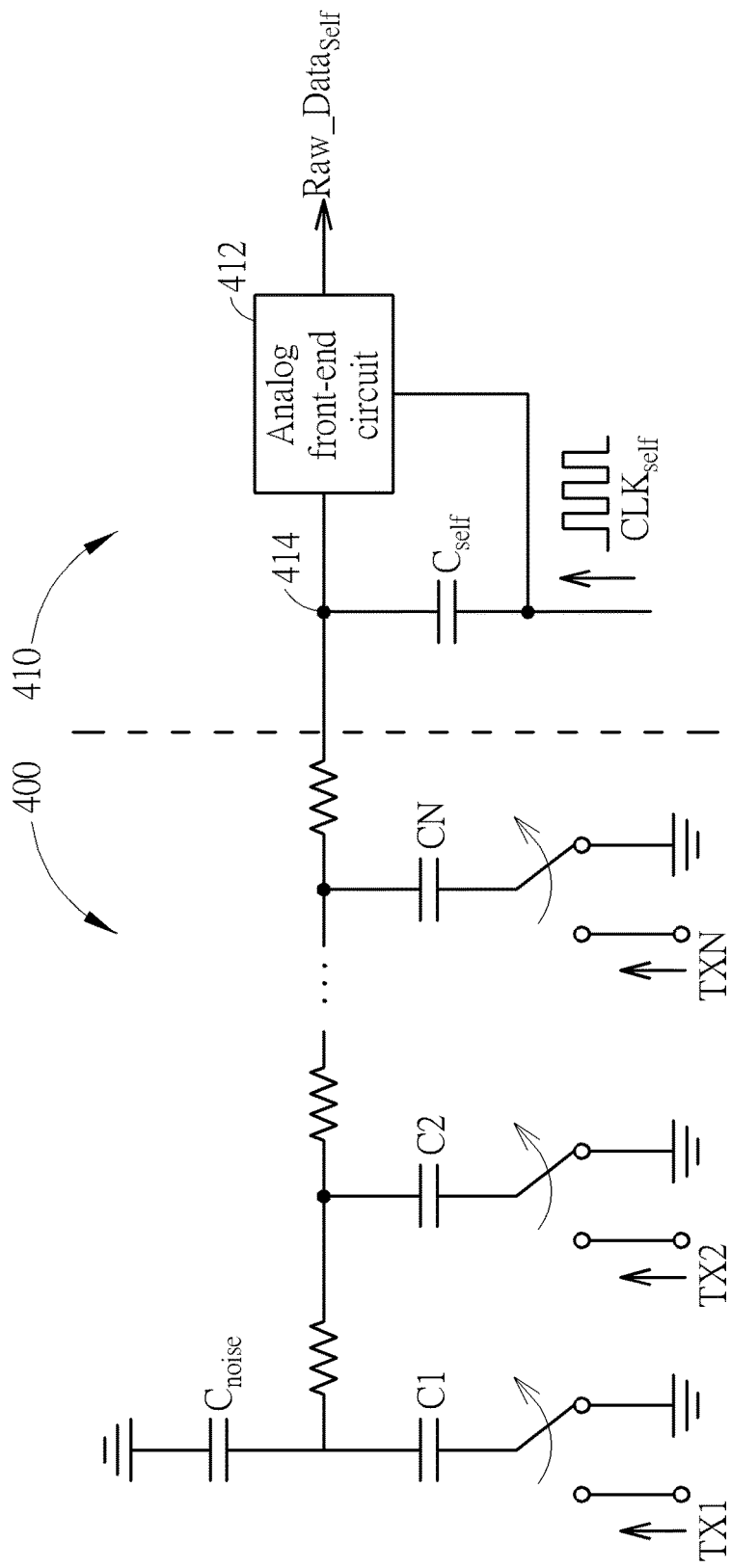
FIG. 5 is a schematic diagram of a self-sensing unit of the capacitive sensing device of FIG. 4.
Figure 6:
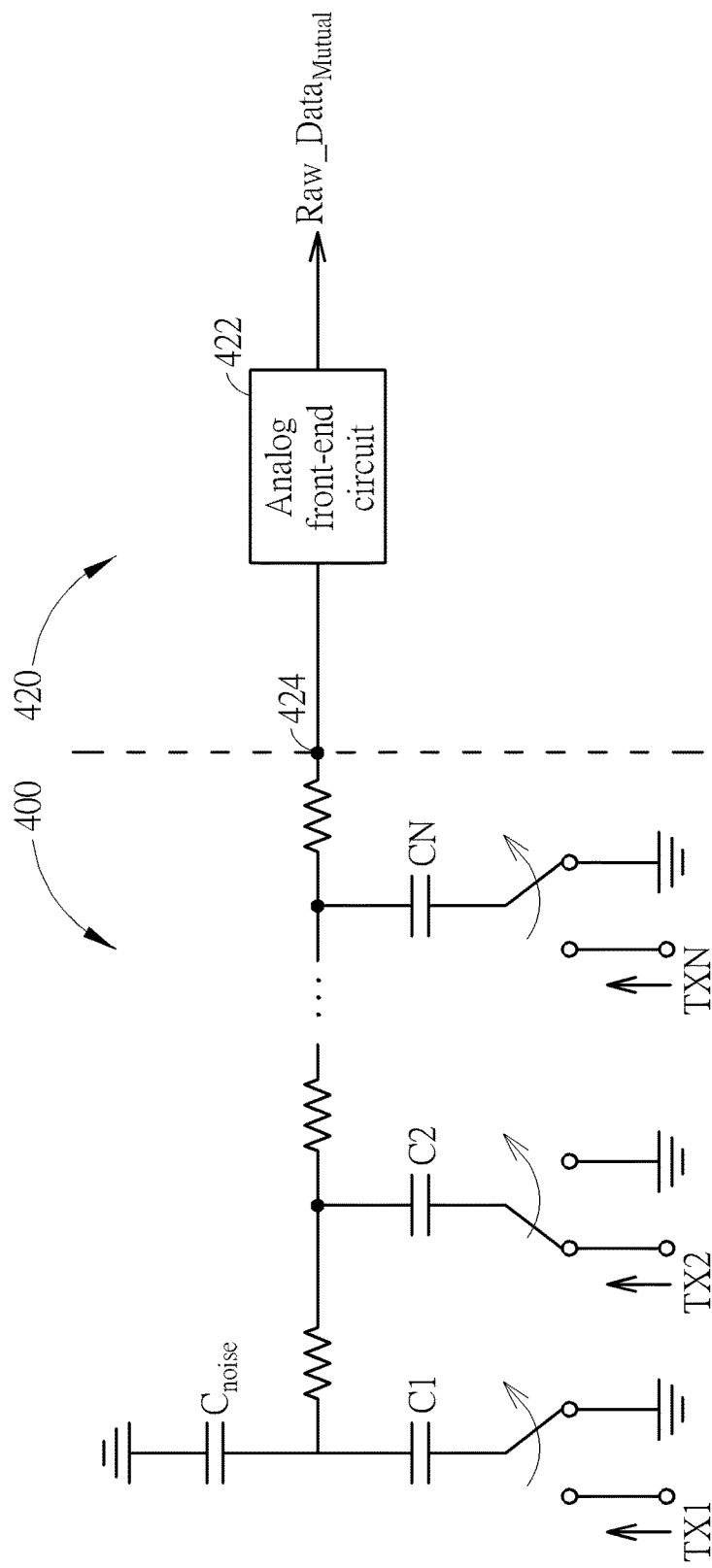
FIG. 6 is a schematic diagram of a mutual-sensing unit of the capacitive sensing device of FIG. 4.

In details, please refer to FIG. 5 and FIG. 6. FIG. 5 is a schematic diagram of the self-sensing unit 410. FIG. 6 is a schematic diagram of the mutual-sensing unit 420. Note that, equivalent circuits of the panel 400 shown in FIG. 5 and FIG. 6 and the panel 100 shown in FIG. 1B are identical, and therefore are denoted by the same symbols. The self-sensing unit 410 includes an analog front-end circuit 412 and a self-sensing capacitor $C_{Self}$. The analog front-end circuit 412 is utilized for detecting a voltage change of a node 114 when a clock signal $CLK_{Self}$ is fed and generating the self-sensing output signal $Raw\_Data_{Self}$ to indicate whether the panel 400 is touched (self-sensing mode). The mutual-sensing unit 420 includes an analog front-end circuit 422. The analog front-end circuit 422 is utilized for detecting a voltage change of a node 424 when the driving signals TX1-TXN are one by one fed and generating the mutual-sensing output signal $Raw\_Data_{Mutual}$ to indicate a touched position of the panel 400 (mutual-sensing mode). The mutual-sensing output signal $Raw\_Data_{Mutual}$ includes a signal component Signal_Data and a bias component Noise_Data, i.e. $Raw\_Data_{Mutual}$=Signal_Data+Noise_Data. The bias component Noise_Data is caused by the parasitic capacitor $C_{noise}$ and the present invention focuses on removing the bias component Noise_Data, such that the calibrated mutual-sensing output signal $Calibrated\_Raw\_Data_{Mutual}$ can be equal to the signal component, i.e. $Calibrated\_Raw\_Data_{Mutual}$=Signal_Data. Note that, an identical analog front-end circuit can be shared in the self-sensing mode and the mutual-sensing mode, which means the analog front-end circuits 412, 422 are the same.

Since the self-sensing unit 410 and the mutual-sensing unit 420 detect the same panel 400, the bias components of the self-sensing output signal $Raw\_Data_{Self}$ and the mutual-sensing output signal $Raw\_Data_{Mutual}$ are caused by the same parasitic capacitor $C_{noise}$, and therefore are proportional to each other by a particular ratio. For that reason, the present invention uses the bias component Noise_Data detected by the self-sensing unit 410 to calculate the calibrated mutual-sensing output signal $Calibrated\_Raw\_Data_{Mutual}$.

In details, the computation unit 430 calculates the self-sensing difference $\beta$ between the self-sensing output signal $Raw\_Data_{Self}$ and the self-sensing static parameter $BASE\_LINE\_RX_N$, i.e. $\beta$=$Raw\_Data_{Self}$−$BASE\_LINE\_RX_N$. Note that, the self-sensing static parameter $BASE\_LINE\_RX_N$ is equal to the self-sensing output signal $Raw\_Data_{Self}$ generated by the self-sensing unit 410 when there is no capacitance change in the panel 400, and can be acquired by circuit experiments or computer simulation. Next, the calibration unit 440 calculates the calibrated mutual-sensing output signal $Calibrated\_Raw\_Data_{Mutual}$, such that $Calibrated\_Raw\_Data_{Mutual}$=$Raw\_Data_{Mutual}$−$\alpha*\beta$, wherein $\alpha$ denotes a magnification parameter. As discussed in the above, since the self-sensing unit 410 and the mutual-sensing unit 420 detect the same panel 400, the self-sensing difference $\beta$ measured by the self-sensing unit 410 is proportional the bias component Noise_Data measured by the mutual-sensing unit 420, such that Noise_Data=$\alpha\beta$. The magnification parameter $\alpha$ can also be acquired by circuit experiments or computer simulation. As a result, the calibrated mutual-sensing output signal $Calibrated\_Raw\_Data_{Mutual}$=$Raw\_Data_{Mutual}$−$\alpha*\beta$=Signal_Data+Noise_Data−$\alpha*\beta$=Signal_Data, in which the bias component Noise_Data is successfully removed.

Figure 7A:
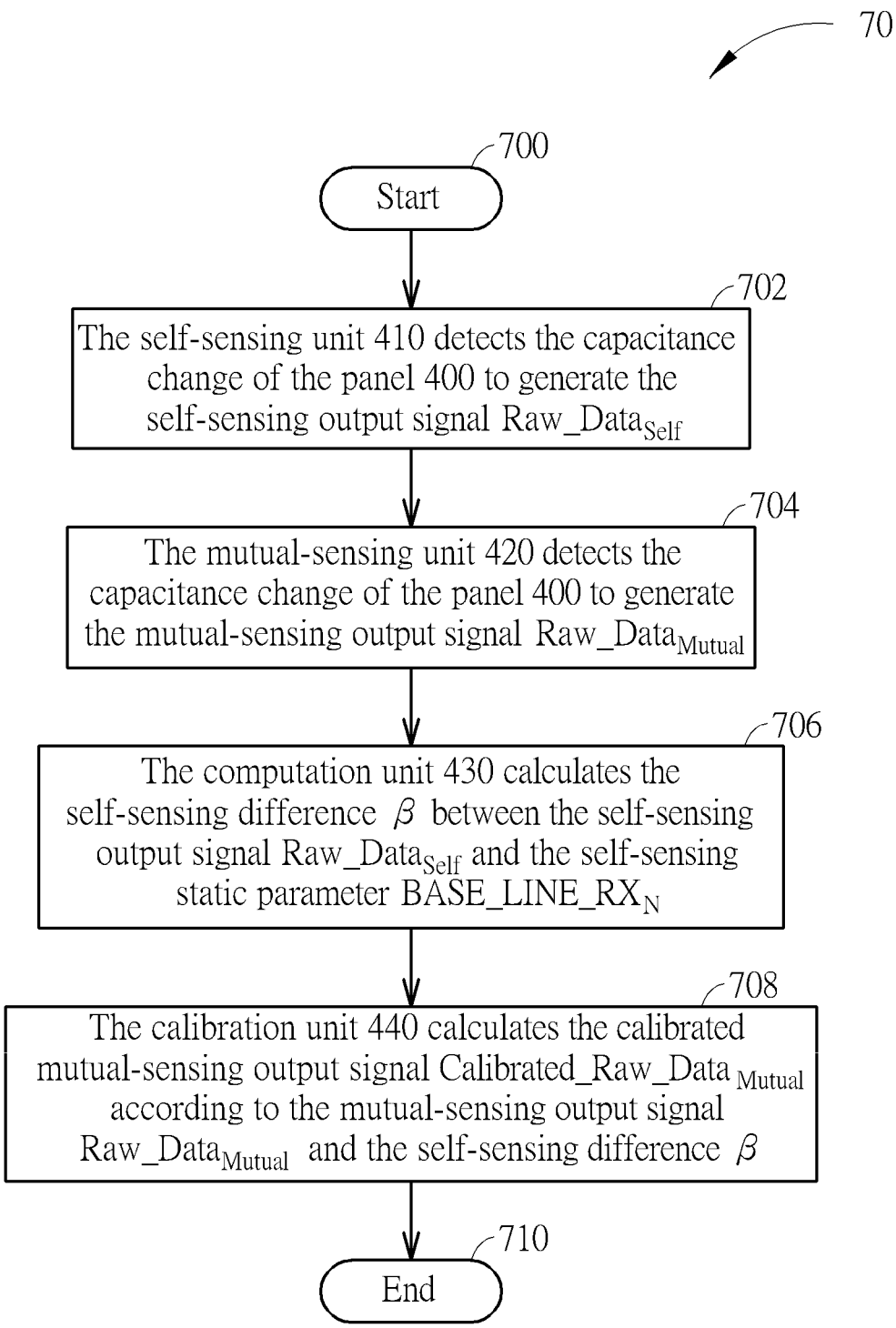
FIG. 7A is a schematic diagram of a calibration process according to an embodiment of the present invention.

Operations of the capacitive sensing device 40 can be summarized into a calibration process 70, as illustrated in FIG. 7A. The calibration process 70 includes the following steps:

Step 700: Start.

Step 702: The self-sensing unit 410 detects the capacitance change of the panel 400 to generate the self-sensing output signal $Raw\_Data_{Self}$.

Step 704: The mutual-sensing unit 420 detects the capacitance change of the panel 400 to generate the mutual-sensing output signal $Raw\_Data_{Mutual}$.

Step 706: The computation unit 430 calculates the self-sensing difference $\beta$ between the self-sensing output signal $Raw\_Data_{Self}$ and the self-sensing static parameter $BASE\_LINE\_RX_N$.

Step 708: The calibration unit 440 calculates the calibrated mutual-sensing output signal $Calibrated\_Raw\_Data_{Mutual}$ according to the mutual-sensing output signal $Raw\_Data_{Mutual}$ and the self-sensing difference $\beta$.

Step 710: End.

Figure 7B:
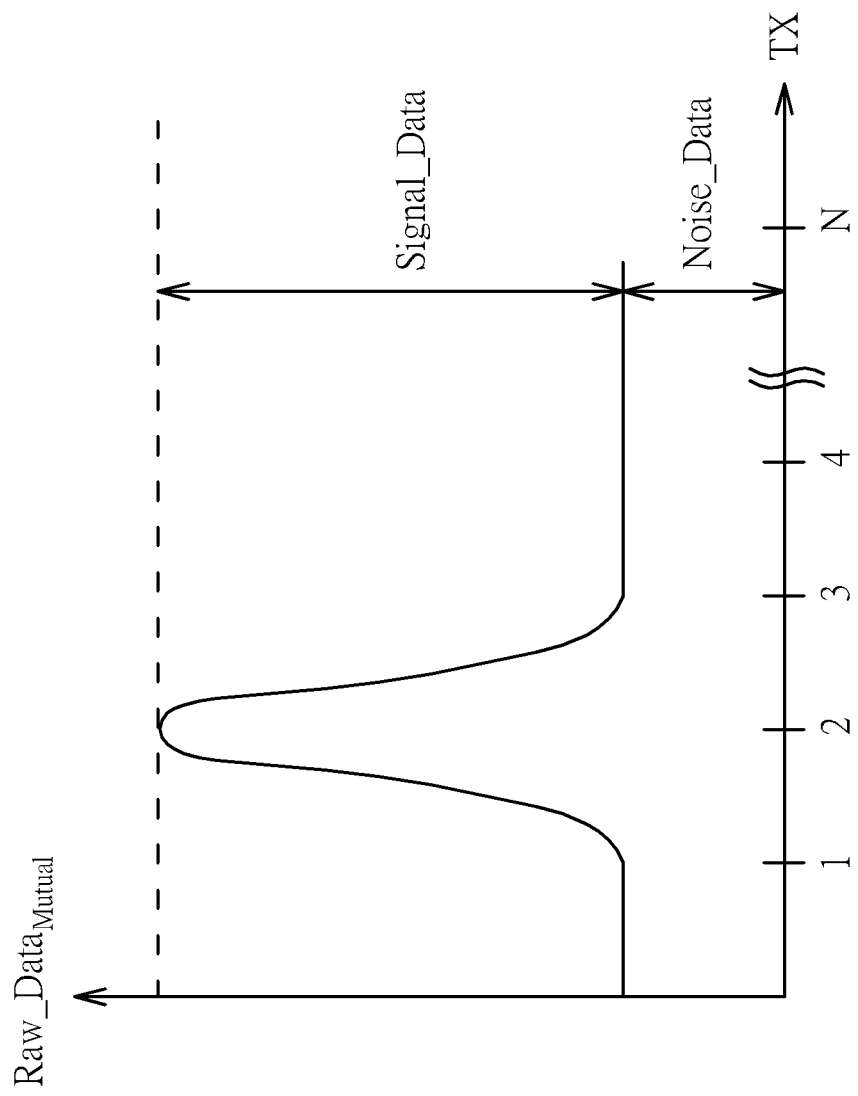
FIG. 7B is a schematic diagram of a mutual-sensing output signal of the capacitive sensing device of FIG. 4.
Figure 7C:
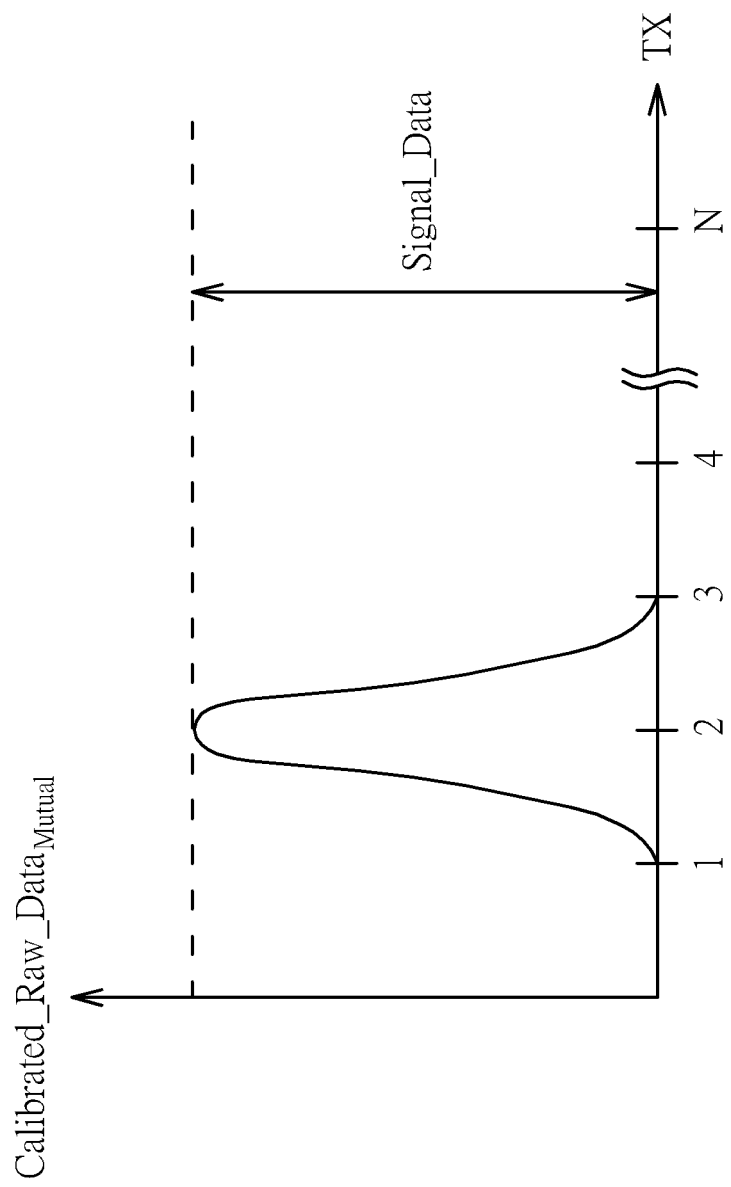
FIG. 7C is a schematic diagram of a calibrated mutual-sensing output signal of the capacitive sensing device of FIG. 4.

Effects of the calibration process 70 are illustrated in FIG. 7B and FIG. 7C. FIG. 7B is a schematic diagram of the mutual-sensing output signal $Raw\_Data_{Mutual}$ before calibration. FIG. 7C is a schematic diagram of the calibrated mutual-sensing output signal $Calibrated\_Raw\_Data_{Mutual}$ In comparison with FIG. 7B, the bias component Noise_Data has been removed in FIG. 7C, such that the calibrated mutual-sensing output signal $Calibrated\_Raw\_Data_{Mutual}$ is pure and can be utilized for determining the touched region of the panel 400 in the following signal recognition process.

Figure 8:
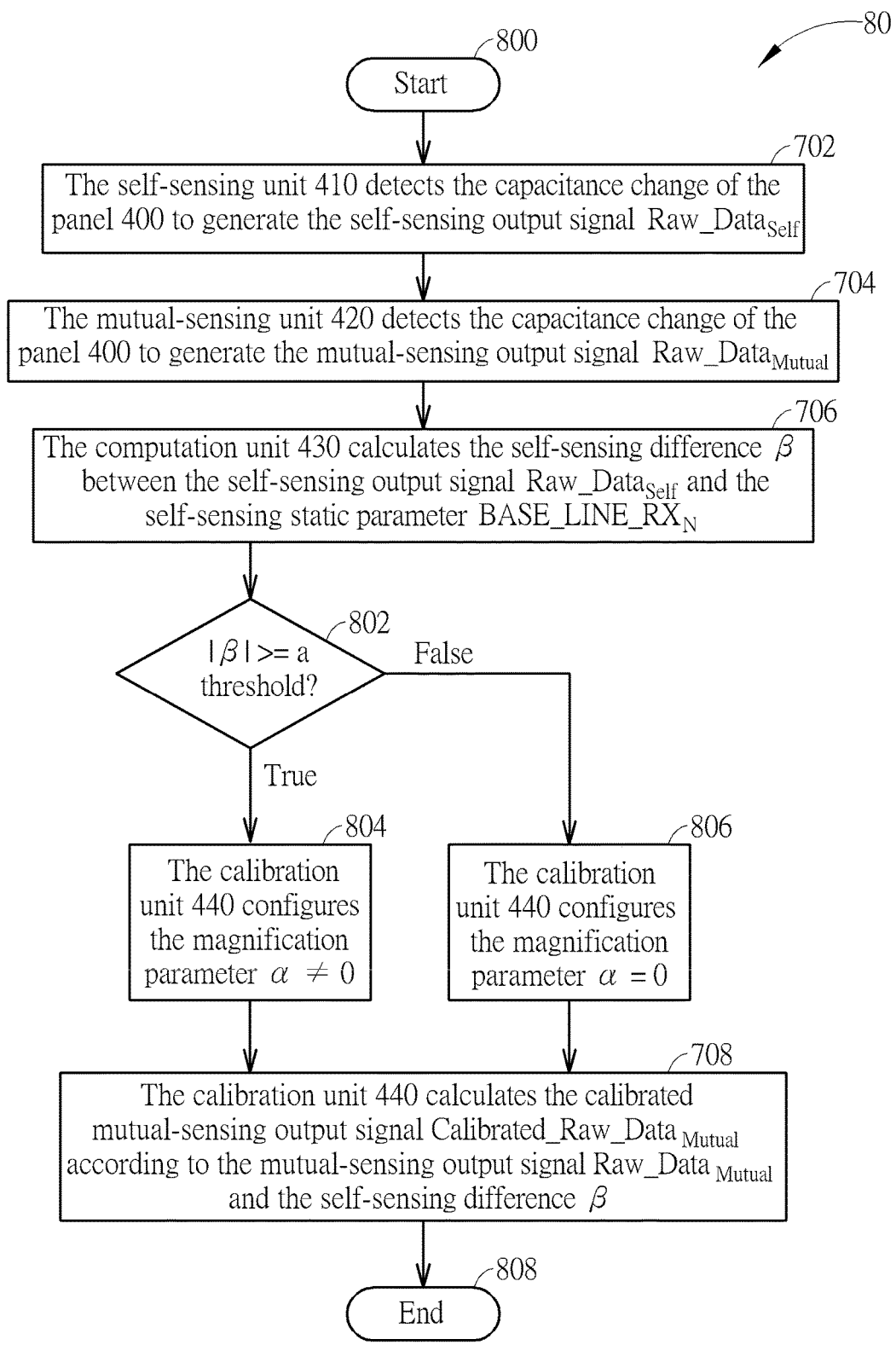
FIG. 8 is a schematic diagram of a calibration process according to an embodiment of the present invention.

A skilled person in the art can modify the calibration process 70 to meet different practical requirements. For example, the calibration unit 440 can further determine whether the bias component Noise_Data caused by the parasitic capacitor $C_{noise}$ is severe according to the self-sensing difference $\beta$. If the bias component Noise_Data is not severe, the calibration steps can be skipped. Specifically, the calibration process 70 can be modified as a calibration process 80, as shown in FIG. 8. The calibration process 80 includes the following steps:

Step 800: Start.

Step 702: The self-sensing unit 410 detects the capacitance change of the panel 400 to generate the self-sensing output signal Raw_Data$_{Self}$.

Step 704: The mutual-sensing unit 420 detects the capacitance change of the panel 400 to generate the mutual-sensing output signal Raw_Data$_{Mutual}$.

Step 706: The computation unit 430 calculates the self-sensing difference β between the self-sensing output signal Raw_Data$_{Self}$ and the self-sensing static parameter BASE_LINE_RX$_N$.

Step 802: |β|>=a threshold? If true, process to Step 804; else, proceed to Step 806.

Step 804: The calibration unit 440 configures the magnification parameter α≠0. Proceed to Step 708.

Step 806: The calibration unit 440 configures the magnification parameter α=0. Proceed to Step 708.

Step 708: The calibration unit 440 calculates the calibrated mutual-sensing output signal Calibrated_Raw_Data$_{Mutual}$ according to the mutual-sensing output signal Raw_Data$_{Mutual}$ and the self-sensing difference β.

Step 808: End.

Since the calibration process 80 is derived from the calibration process 70, identical steps are denoted by the same symbols. Regarding the additional Steps 802, 804, 806, the calibration unit 440 further configures the magnification parameter α to be zero when an absolute value 101 of the self-sensing difference β is smaller than the threshold. The magnification parameter α=0 means that no calibration is performed, i.e. Calibrated_Raw_Data$_{Mutual}$=Raw_Data$_{Mutual}$=Signal_Data+Noise_Data.

To sum up, in order to acquire the pure mutual-sensing output signal, the present invention relies on the signal correlation between the self-sensing mode and the mutual-sensing mode of the capacitive sensing device to remove the bias component from the mutual-sensing output signal based on the self-sensing output signal. As a result, the following touch recognition process can be enhanced with the pure mutual-sensing output signal.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A calibration method for a capacitive sensing device, the capacitive sensing device capable of operating in a self-sensing mode or a mutual-sensing mode, the calibration method comprising:
   detecting a capacitance change of a panel in the self-sensing mode to generate a self-sensing output signal;
   detecting a capacitance change of the panel in the mutual-sensing mode to generate a mutual-sensing output signal;
   calculating a self-sensing difference between the self-sensing output signal and a self-sensing static parameter; and
   calibrating the mutual-sensing output signal according to the mutual-sensing output signal and the self-sensing difference;
   wherein the step of calibrating the mutual-sensing output signal according to the mutual-sensing output signal and the self-sensing difference comprises:
      calculating a calibrated mutual-sensing output signal to be the mutual-sensing output signal minus a product of a magnification parameter and the self-sensing difference.

2. The calibration method of claim 1, wherein the self-sensing difference is equal to the self-sensing output signal minus the self-sensing static parameter;
   wherein the self-sensing static parameter is equal to the self-sensing output signal when there is no capacitance change in the capacitive sensing device in the self-sensing mode.

3. The calibration method of claim 1, further comprising determining the magnification parameter according to the self-sensing difference.

4. The calibration method of claim 3, wherein the step of determining the magnification parameter according to the self-sensing difference comprises:
   configuring the magnification parameter to be zero when an absolute value of the self-sensing difference is smaller than a threshold.

5. A capacitance sensing device for a panel, the capacitive sensing device comprising:
   a self-sensing unit, electrically coupled to the panel, for detecting a capacitance change of the panel to generate a self-sensing output signal;
   a mutual-sensing unit, electrically coupled to the panel, for detecting a capacitance change of the panel to generate a mutual-sensing output signal;
   a computation unit, electrically coupled to the self-sensing unit, for calculating a self-sensing difference between the self-sensing output signal and a self-sensing static parameter; and
   a calibration unit, electrically coupled to the computation unit and the mutual-sensing unit, for calibrating the mutual-sensing output signal according to the mutual-sensing output signal and the self-sensing difference;
   wherein the calibration unit is further utilized for calculating a calibrated mutual-sensing output signal to be the mutual-sensing output signal minus a product of a magnification parameter and the self-sensing difference.

6. The capacitance sensing device of claim 5, wherein the self-sensing difference is equal to the self-sensing output signal minus the self-sensing static parameter;
   wherein the self-sensing static parameter is equal to the self-sensing output signal when there is no capacitance change in the self-sensing unit.

7. The capacitance sensing device of claim 5, wherein the calibration unit is further utilized for determining the magnification parameter according to the self-sensing difference.

8. The capacitance sensing device of claim 7, wherein the calibration unit is further utilized for configuring the magnification parameter to be zero when an absolute value of the self-sensing difference is smaller than a threshold.

* * * * *